United States Patent [19]
Sternad

[11] Patent Number: 5,018,926
[45] Date of Patent: May 28, 1991

[54] AUTOMATIC STORAGE AND RETRIEVAL APPARATUS

[76] Inventor: William A. Sternad, 18415 N. 30th Pl., Plymouth, Minn. 55447

[21] Appl. No.: 348,552

[22] Filed: May 8, 1989

[51] Int. Cl.$^5$ .......................................... E04H 6/06
[52] U.S. Cl. ................... 414/253; 414/234; 414/236; 414/240; 414/239; 414/232; 414/252; 414/264; 414/255
[58] Field of Search ............... 414/236, 237, 239, 240, 414/241, 234, 233, 231, 232, 227, 244, 245, 246, 247, 249, 252, 253, 255, 256, 257, 259, 260, 261, 262, 264, 273

[56] References Cited

U.S. PATENT DOCUMENTS

| | | | |
|---|---|---|---|
| 2,028,476 | 1/1936 | Rome et al. | 414/241 X |
| 2,268,800 | 1/1942 | Butzien | 414/264 |
| 2,569,393 | 9/1951 | Walker | 414/234 |
| 2,864,515 | 12/1958 | Marshall | 414/236 X |
| 3,040,913 | 6/1962 | Foster, Jr. et al. | 414/236 |
| 3,061,120 | 10/1962 | Barnett | 414/240 |
| 3,125,235 | 3/1964 | Frangos | 414/249 X |
| 3,217,905 | 11/1965 | Frangos | 414/239 |
| 3,525,186 | 8/1970 | Lombardo | 414/255 X |
| 3,680,718 | 8/1972 | Miyachi | 414/239 |
| 4,825,927 | 5/1989 | Woodrow | 414/232 X |

FOREIGN PATENT DOCUMENTS

| | | | |
|---|---|---|---|
| 1097120 | 1/1961 | Fed. Rep. of Germany | 414/239 |
| 1244432 | 9/1960 | France | 414/236 |
| 457694 | 5/1950 | Italy | 414/241 |
| 904832 | 8/1962 | United Kingdom | 414/256 |

*Primary Examiner*—Frank E. Werner
*Attorney, Agent, or Firm*—Moore & Hansen

[57] ABSTRACT

Storage and retrieval apparatus and method using pallets for storing vehicles and other loads. A number of storage levels aligned vertically are reached by a pair of lifts in shafts which bracket the levels. A transfer mechanism can push a pallet and automobile from either lift onto any level. Each level is always filled with pallets and sized to exactly hold an integral number of pallets. When a pallet is pushed into a level from one lift the intermediate pallets are pushed laterally to the opposite lift, resulting in the farthest pallet being ejected onto the opposite lift located at the same level. Separate loading stations are provided on ground level for each lift. An automobile can be driven on or off a pallet or a load placed on or off a pallet at the loading station. A loading station mechanism can move a pallet with a load to be stored from the loading station onto a lift. The lift transfer mechanism can transfer a pallet with a load being retrieved from the lift onto the loading station mechanism adjacent the lift, and the loading station mechanism can move the pallet from there to the loading station. A computer having input apparatus, input sensors, output apparatus and displays, utilizes a program to control and optimize the operation. Input identifiers for each automobile, or other load, and pallet are entered into the computer upon storage to permit ready retrieval.

20 Claims, 9 Drawing Sheets

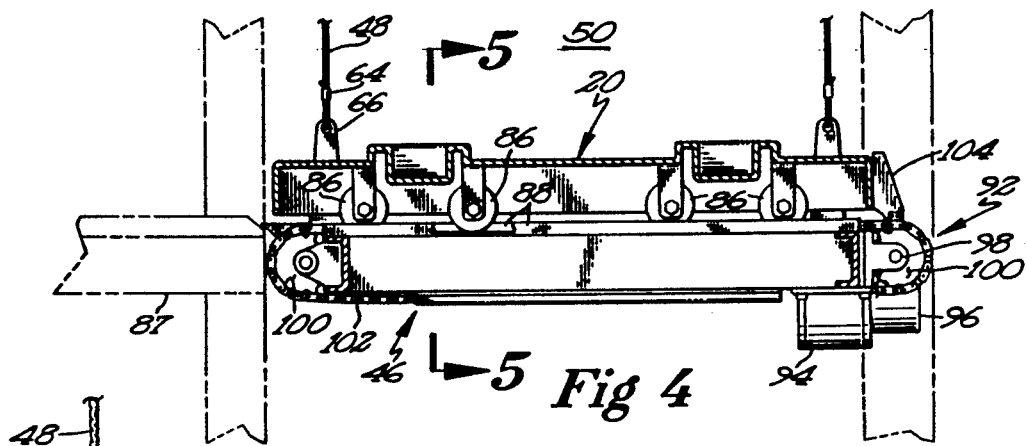
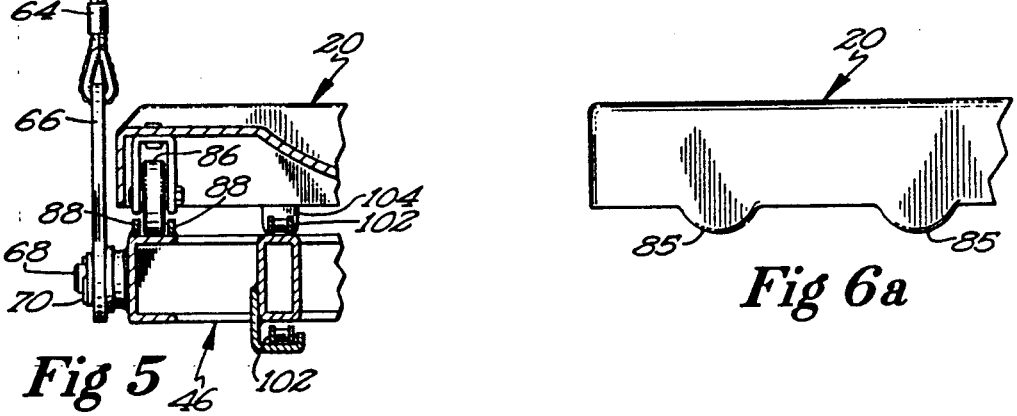
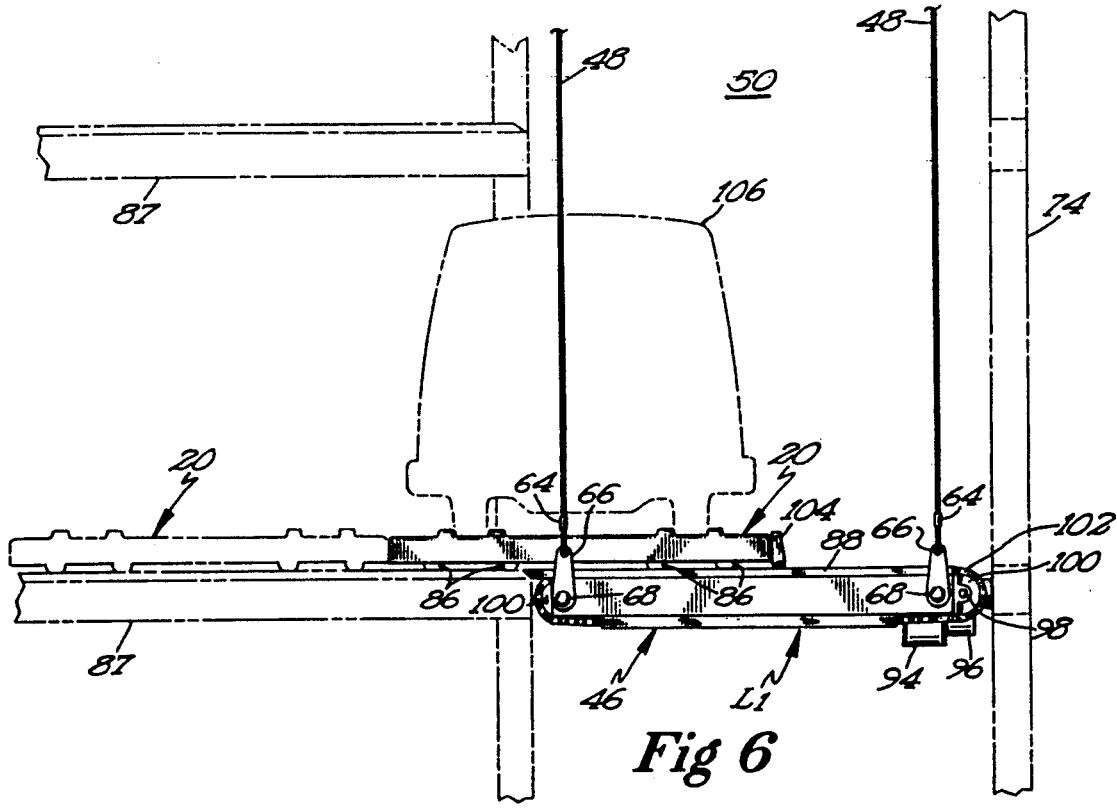

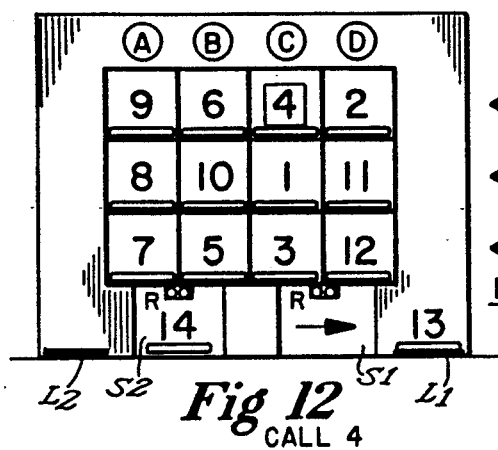
Fig 12 CALL 4
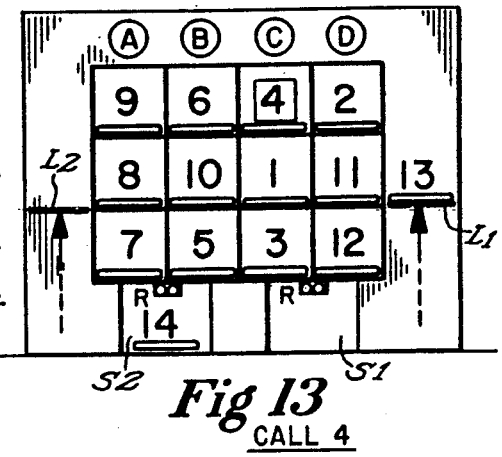
Fig 13 CALL 4
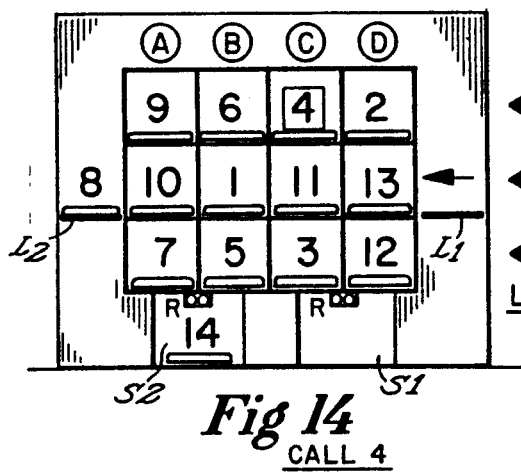
Fig 14 CALL 4
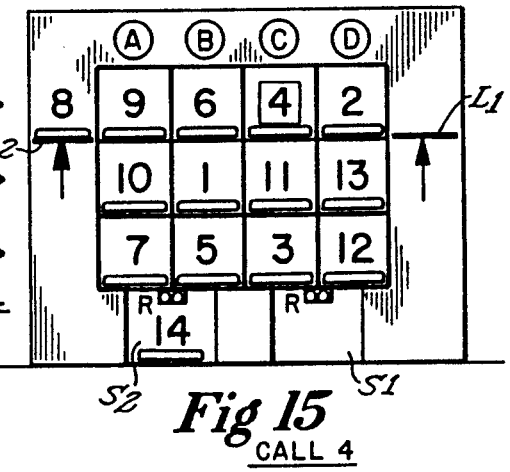
Fig 15 CALL 4
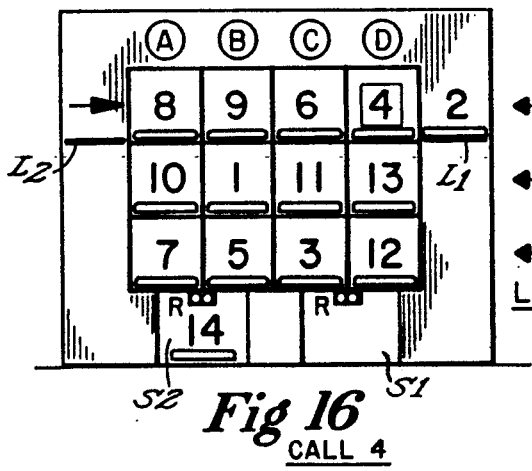
Fig 16 CALL 4
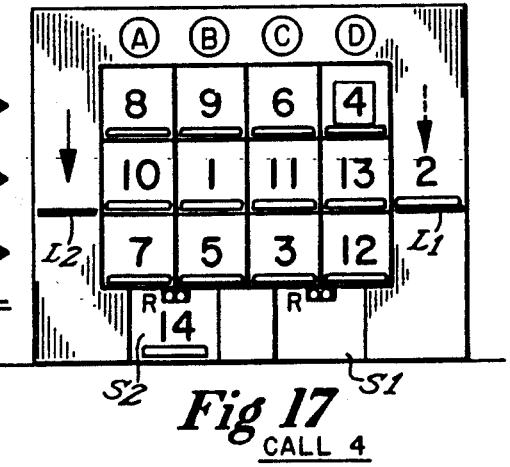
Fig 17 CALL 4

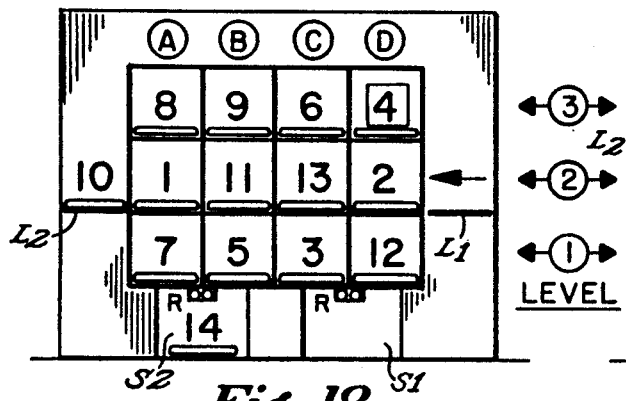
Fig 18 CALL 4
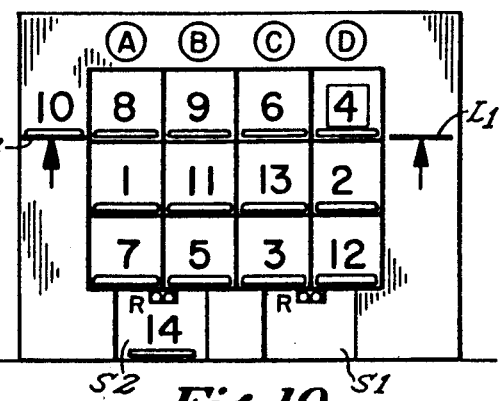
Fig 19 CALL 4
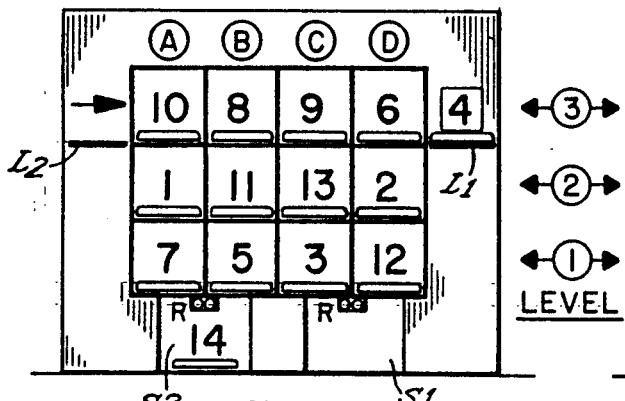
Fig 20 CALL 4
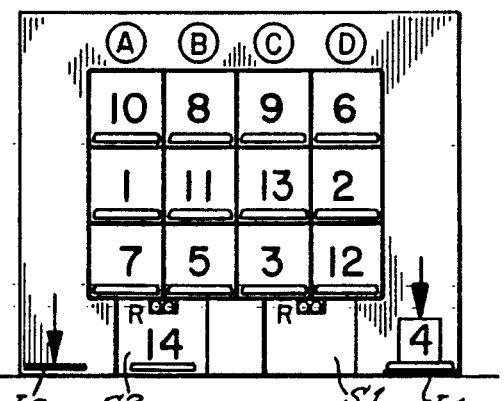
Fig 21 CALL 4
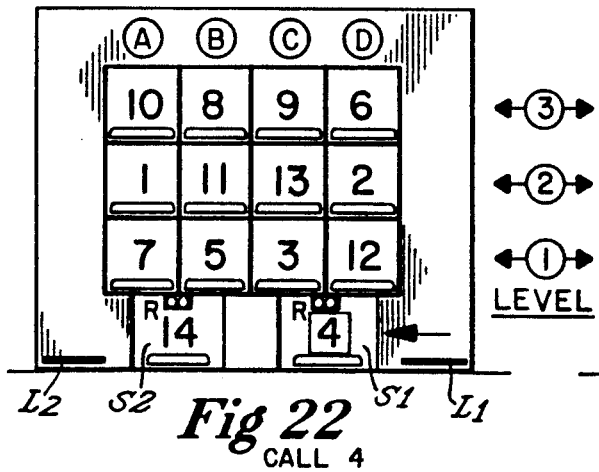
Fig 22 CALL 4
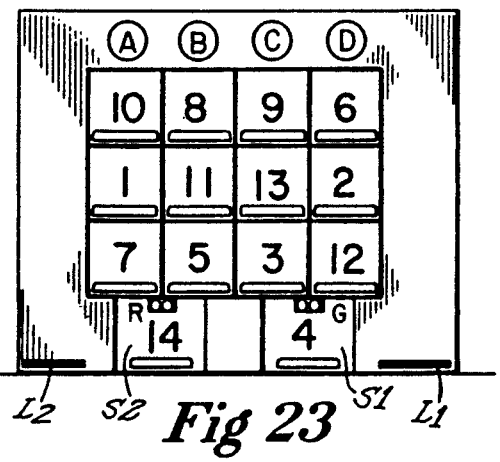
Fig 23

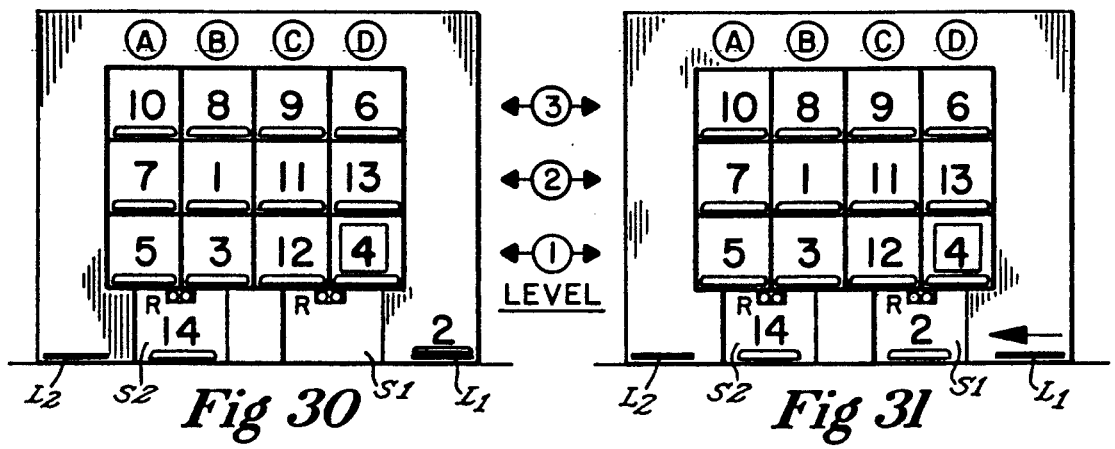
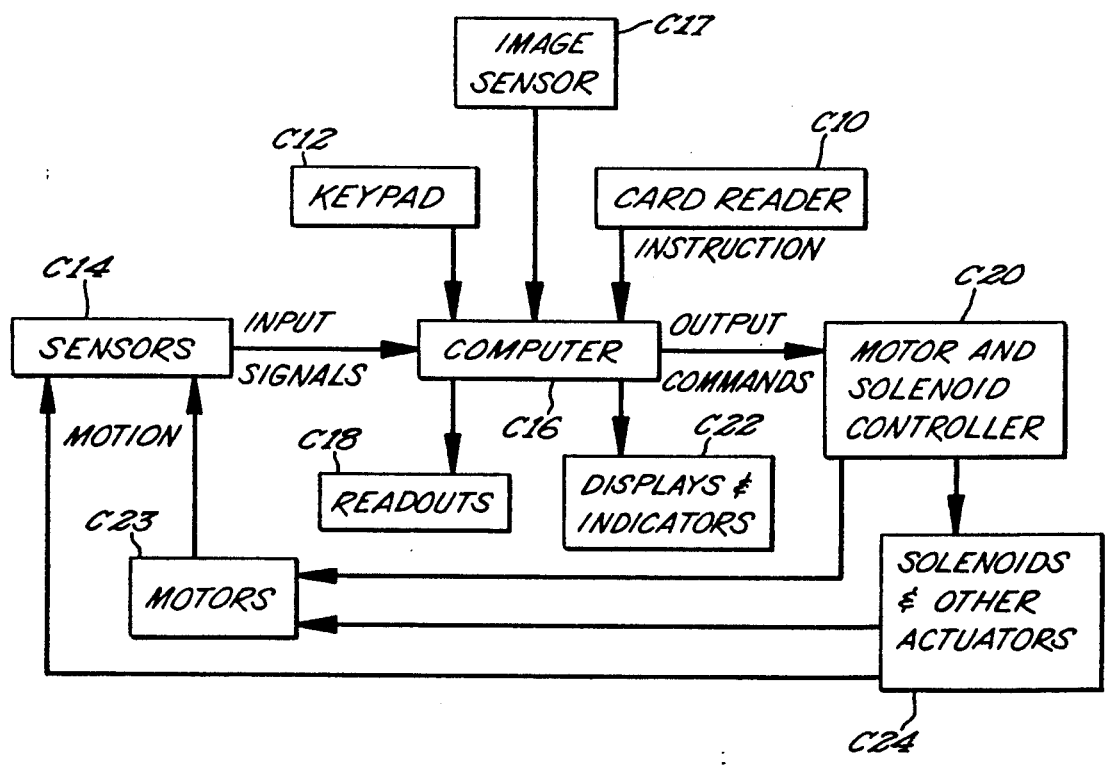
Fig 32

AUTOMATIC STORAGE AND RETRIEVAL APPARATUS

BACKGROUND OF THE INVENTION

The present invention relates to a structure containing apparatus to provide the automatic storage and retrieval of pallets which hold items to be stored. The invention is directed here particularly to automobile storage and retrieval, however the same structure and apparatus can be used to store any pallet held items.

A number of structures with automatic storage and retrieval apparatuses utilizing pallets to hold the stored items are shown in the art. In Burch et al, U.S. Pat. No. 3,746,189, a structure utilizes a transfer cart to move a pallet to one of a number of vertical storage spaces where a vertical lift elevates the pallet to a storage area.

In Buttironi, U.S. Pat. No. 4,337,013, a service track is provided with a motored traveling wagon to move a number of pallets along the service track. In Alfred et al, U.S. Pat. No. 4,074,120, a storage retrieval machine is utilized to store or retrieve loads of materials from predetermined locations under computer control with computer identification of each load and location.

In Van Stokes et al, U.S. Pat. No. 4,674,938, a frame supported by a base has a nested upper and lower platform adapted to be moved upward to provide vertically oriented storage locations. In Bright, U.S. Pat. No. 3,927,773, a load handling storage and retrieval installation has storage positions extending between service aisles with driven carriages in the service aisles and a captive pallet for each load storage position with lineal and transverse drive means mounted on the driven carriages with control means to load and unload the storage positions.

In Byrd, U.S. Pat. No. 4,738,579, an automated parking garage system with a plurality of modules in a grid pattern uses a number of hydraulic powered lifts to position modules vertically.

None of these inventions utilize a completely passive storage structure combined with the use of machinery on a pair of lifts to provide all necessary machinery to load and unload pallets from any floor. The positioning of two lifts at opposite ends of a storage level to permit machinery on one lift moving a pallet on a storage level to eject a pallet on the opposite lift, allowing the use of a passive storage structure is not taught.

SUMMARY OF THE INVENTION

An automatic storage and retrieval system for a pelletized loads has been adapted particularly for automobiles. Identical pallets have a set of four recesses in the upper surface with spacing and dimensions to accommodate the four wheel footprint of all conventional automobiles and pickup trucks. The pallets are stored automatically within a vertical storage structure consisting primarily of structural steel I-beams organized into a number of identical levels. A pair of lifts are located adjacent to opposite ends of the storage area with all of the necessary equipment to carry the pallets between levels and to move the pallets from the lifts onto any level The lift movements are coordinated, such that when one lift is stopped adjacent to one end of a level the other lift is stopped adjacent to the opposite end.

The pallets are off-loaded from either lift by a transfer mechanism, which simply pushes a pallet horizontally a distance equal to the pallet width from the lift onto the adjacent storage level. The storage structure is sized such that an integral number of pallets will exactly fill the storage space between the two lifts. The pallets are mounted upon wheels or skids which are aligned to permit moving the pallets perpendicular to the lifts and which ride upon a pair of steel members extending from lift to lift on each level. The lifts are suspended from cables which are used to position the lifts. The lifts are suspended a slight distance away from the storage area of each level. Before the pallets are off-loaded a bridging mechanism moves both lifts horizontally toward the respective adjacent storage space, until the pallets abut the adjacent level and close the gap between them. The gaps between the storage space and both the lifts are closed at the same time.

In use, all pallet spaces on all storage levels are occupied by pallets whether they contain an automobile or not. When a pallet is off-loaded from a first lift each successive pallet from the first lift to a second opposed lift is moved horizontally by the action of the transfer mechanism pushing the pallet off the first lift. This arrangement permits the storage structure itself to be completely passive. This greatly reduces the complexity of the overall system with a corresponding improvement in reliability. This results in the pallet on the opposite end of the storage space adjacent the second lift being transferred to the second lift. After a pallet is transferred to the second lift both lifts are moved away from the adjoining storage space by the bridging mechanism to permit moving the lifts to a different level. This is the basic storage and retrieval operation for the pallets which allows using a passive storage structure.

The ground level of the structure contains no storage space but instead normally contains a pallet in each of two loading stations. Each loading station has a pair of steel rails which extend to the respective adjacent lift to permit loading the pallet upon the lift. Loading mechanisms are arranged which can move a pallet from the respective loading station onto the adjacent lift. The lift is moved adjacent to the steel rails by the bridging mechanism prior to moving a pallet to or from the lift. A guard fence extending upward alongside each lift provides passenger protection. The guard fence is lowered below the steel rails when loading or off-loading a pallet on or from the lift. After the pallet is moved the fence is moved to the original location.

Automobiles to be stored are driven onto a pallet located at either of the two loading stations The pallet and automobile are transferred from the loading station to the adjacent lift by the loading mechanisms after the bridging mechanism has closed the gap. Automobiles retrieved from the storage level are transferred in the same way by the loading mechanism to the loading station where they can be driven away through the opposite side of the structure.

When an automobile is driven onto a pallet at a loading station and transferred to the first space on a storage level, the pallet displaced on the opposite end of that level is transferred by the lift to another level to displace a second pallet back onto the first lift, so a pallet can be returned to the original loading station to receive another automobile. When automobiles are already located within storage locations it may be necessary to make several similar transfers of pallets across and between levels to obtain an empty pallet for the loading station.

The entire system is under computer control with each stored automobile being associated with identifier codes kept in a running inventory. The automobile identifier is inserted by a credit card reader or a number code inserted by the user after the automobile is driven onto the loading station pallet. Programs in the computer determine the optimum rearrangement of pallets to return either a requested automobile or an unoccupied pallet to a loading station.

An automobile is requested from its storage location by the automobile identifier. In this case a pallet from a loading station is used to displace the pallet containing the automobile requested from the appropriate storage level to the opposite lift. If the automobile requested is not adjacent the opposite lift the pallet and automobile must then be shifted across and then moved to a different level to be returned to the empty loading station by a series of transfers between floors.

The operation of the entire system is monitored by a computer using a number of sensors as to the position of each lift, loading mechanisms and transfer mechanism. This information is used to control the operation of the system. No human intervention is required unless a failure occurs in which case the operation is halted, and an on site supervisor is summoned by the computer system using appropriate indicators.

DESCRIPTION OF THE DRAWINGS

FIG. 4 is a cross-section of FIG. 3 taken along 4—4.

FIG. 5 is a cross-section fragment of FIG. 4 taken along 5—5.

FIG. 6 is a front view of a lift, pallets, automobile in phantom outline and adjacent structure.

FIG. 6A is a detail of a pallet with skids instead of wheels.

FIGS. 12-31 are schematic representations of the systems operations.

FIG. 32 is an electrical block diagram of the system.

DESCRIPTION OF THE PREFERRED EMBODIMENT

Figure 1:
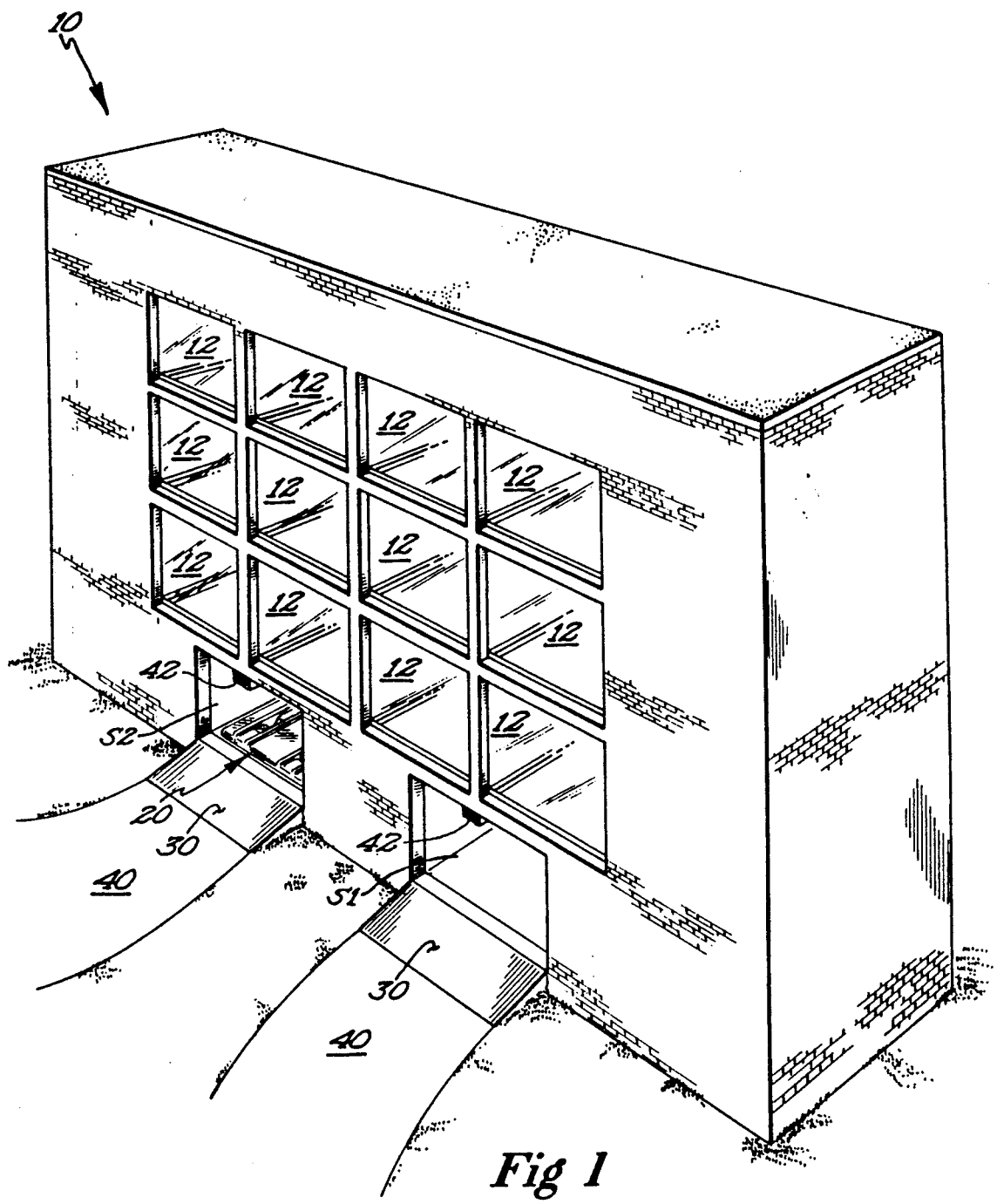
FIG. 1 is a perspective view of an automatic storage and retrieval structure.

In FIG. 1 on overview of the automobile storage structure 10 is shown. A number of storage locations 12 are shown. Ground level loading stations S1 and S2 are also shown. Station S2 has a pallet 20 in place oriented to permit driving a car onto the pallet. Ramps 30 provide a path from outside driveways 40 to loading stations S1 and S2.

Automobiles are driven along driveways 40 and up ramps 30 to loading stations S1 or S2. Loading stations S1 or S2 must contain a pallet 20 to accommodate the automobile and either barriers or light signals will direct the motorist to wait if no pallet is present.

Figure 2:
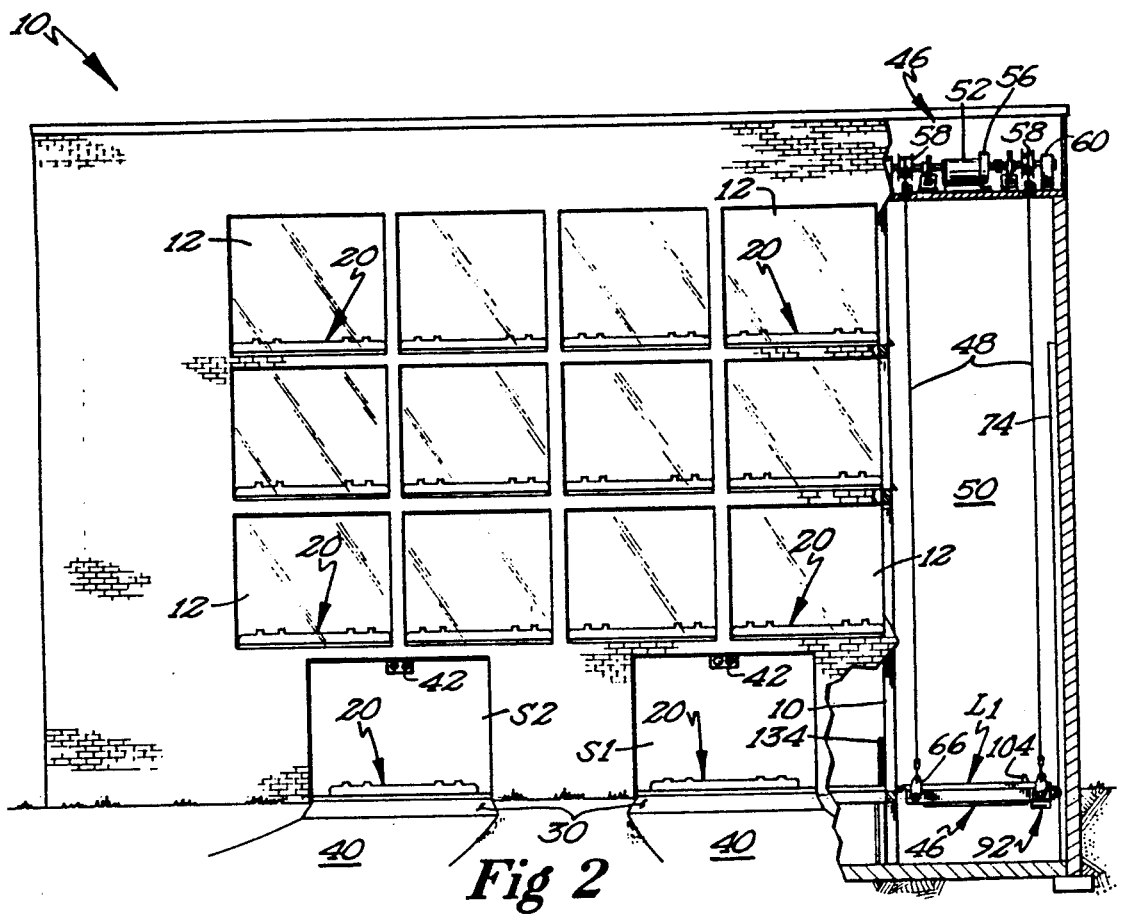
FIG. 2 is a front view of an automatic storage and retrieval structure with a cut-away section over one lift.

In FIG. 2 the relationship of loading station S1 to lift L1 and to the storage levels can be seen with storage spaces located on the three levels. A lift L2, not shown in this figure, which is identical to lift L1 except being loaded from the opposite side, is located on the opposite side of the storage area.

Figure 3:
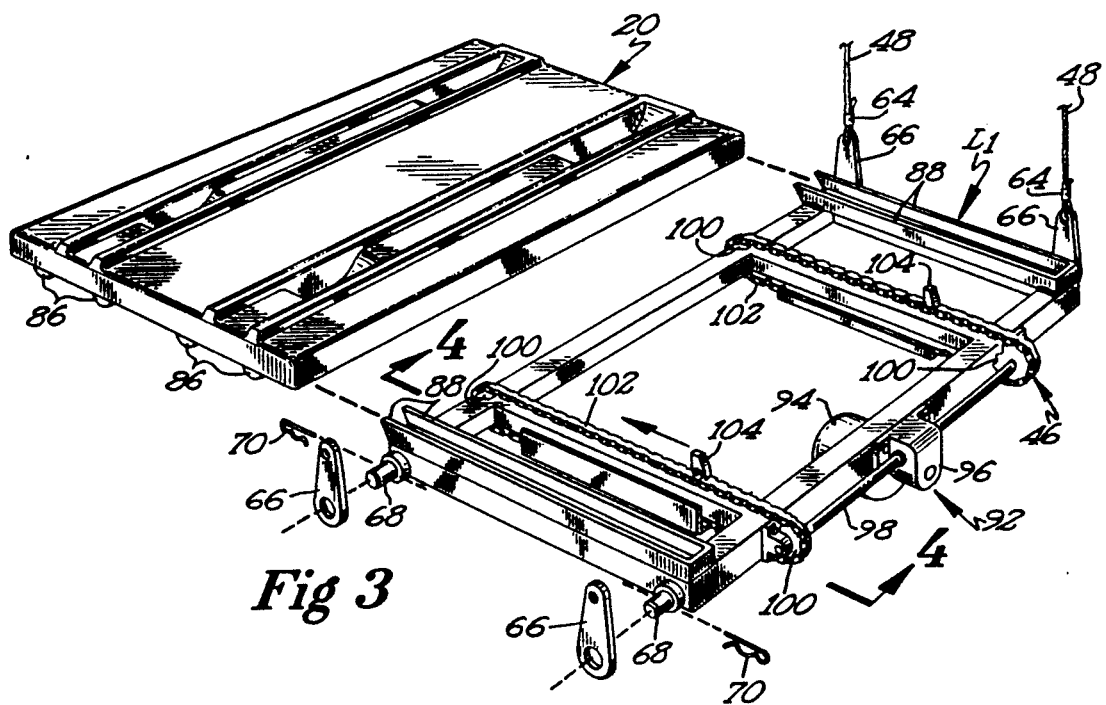
FIG. 3 is a perspective view of a lift and pallet.
Figure 7:
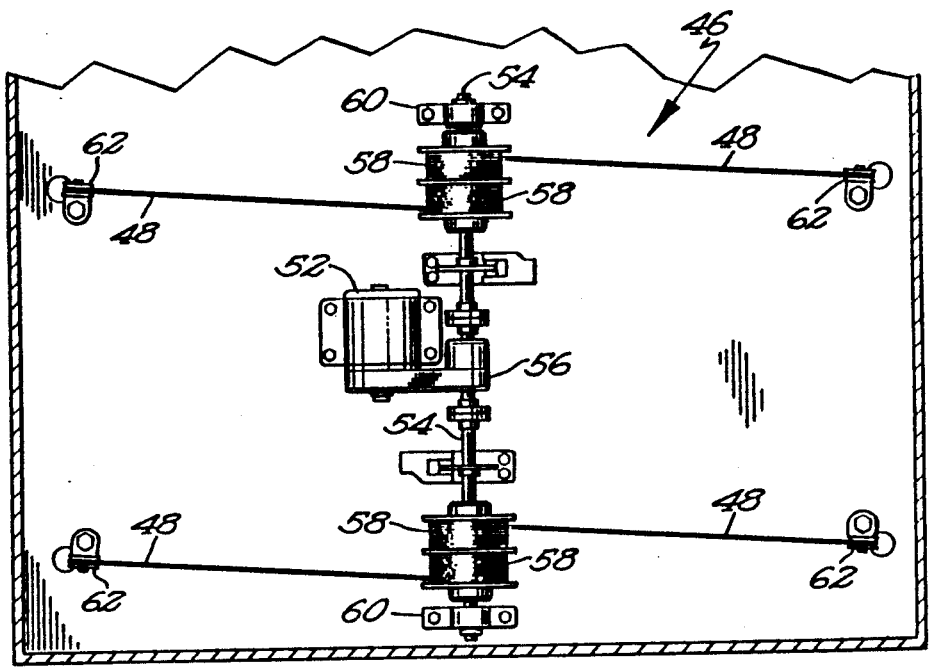
FIG. 7 is a top view of the lift mechanism.

Lift L1 is raised and lowered by lift mechanism 46 acting through cables 48, one being attached to each corner of lift L1. Lift L1 is raised and lowered within shaft 50. Lift L2 with identical associated equipment is located in an identical shaft located adjacent the opposite end of the storage locations, not shown in this figure. With this arrangement lifts L1 and L2 can be positioned opposite any storage level of opposite the ground level loading stations. In FIG. 7 lift mechanism 46 consisting of an electric motor 52 driving a drive shaft 54 through reduction gearing 56 to rotate four drums 58 can be seen. Bearings about shaft 54 are supported by stands 60. Each cable 48 is attached to a drum 58 keyed to shaft 54. Rotating shaft 54 in one direction will elevate lift L1 by winding up cables 48 and in an opposite direction will lower the lift by unwinding the cables. Since all four drums 58 are the same size the four corners of lift L1 will be moved identical amounts and the lift will remain horizontal. Pulleys 62 guide cables 48 from drums 58 through adjacent holes to lift L1. The control of electrical motor 52 is by a computer which will be described later. FIG. 3 shows the attachment means for cables 48 to lift L1 with the cable bight secured by a clamp 64 through a hole in line 66, and having a hole in the opposite end which fits over a stud 68 extending from each corner of the lift. Links 66 are secured in place over studs 68 by cotter pins 70 mounted through a hole in the respective stud. This arrangement permits a certain amount of lateral movement in lift L1 and is necessary to abut the lift against the storage area.

Figure 8:
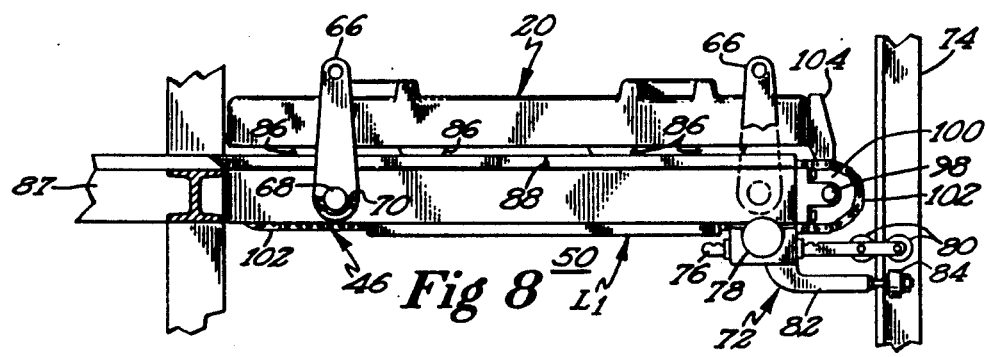
FIG. 8 is a front view of the bridging mechanism with the gap between the storage area closed.
Figure 9:
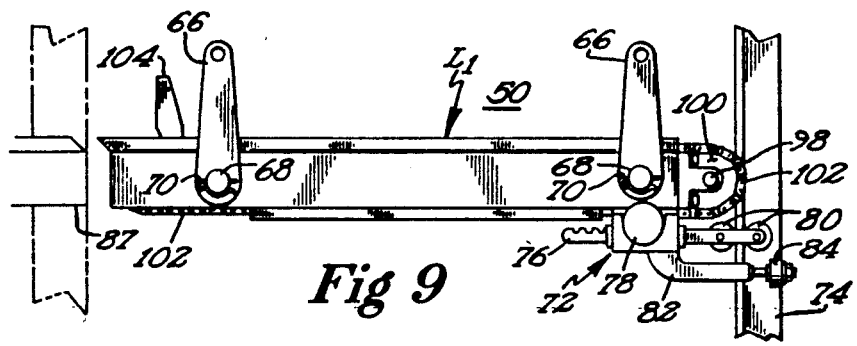
FIG. 9 is the same view as FIG. 8 with the gap open.
Figure 10:
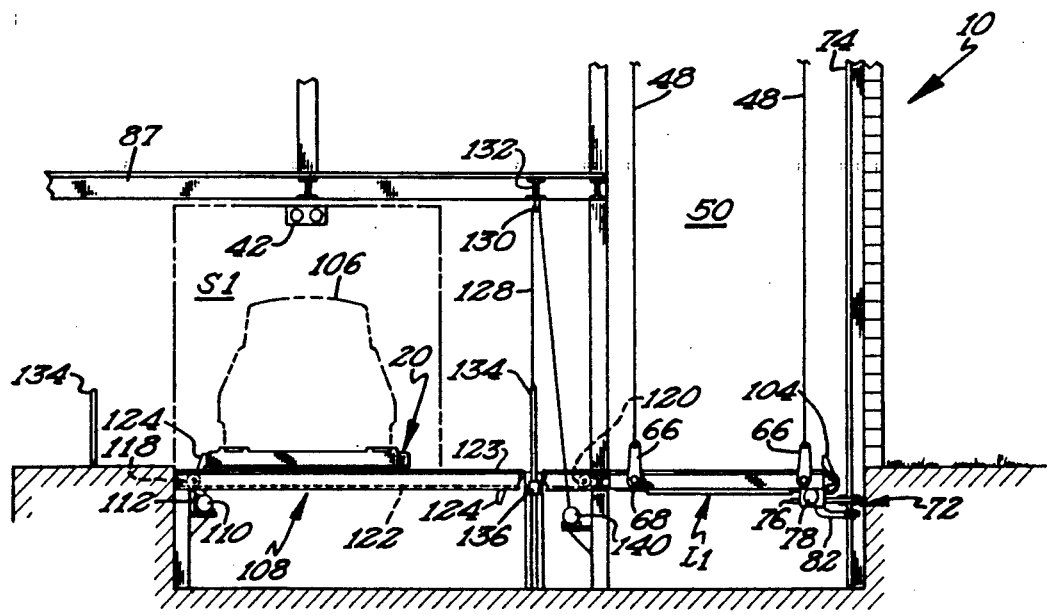
FIG. 10 is a front view of a portion of the framework and lift.

In FIGS. 8, 9, 10 the operation of bridging mechanism 72 is shown. At least one vertical steel guide rail 74 extends up shaft 50 as shown in FIGS. 2, 6, 8, 9, and 10. Preferably two such guide rails are utilized, one adjacent to each corner of lift L1 opposite the storage area. Lifts L1 and L2 both have the same arrangement, except they are oriented opposite to each other with the storage area between. A rotary pinion (not shown) driven by a motor 78 engages a horizontal rack 76 to move the lift horizontally. A pair of rollers 80 engage opposite sides of the edge of guide rail 74 to provide a purchase for rack 76. An arm 82 extending from bridging mechanism 72, terminating in roller 84 mounted perpendicular to rollers 80 bears against the web of guide rail 74, to insure that rack 76 clears the guide rail and rollers 80 engage the edge of the guide rail. In FIG. 8 lift L1 is shown in a leftwardly moved position on rack 76 with a beveled edge extending from the top edge of lift L1 touching a mating beveled edge along the top surface of a horizontal I-beam 87. A proximity switch, not shown, detects this touching and is used to control rotary motor 78.

In FIG. 9 lift L1 has been retracted by the pinion on rotary motor 78 to move lift L1 rightward until a gap is present between I-beam 87 and the lift which permits moving the lift vertically. FIG. 10 illustrates how links 66 can permit this lateral movement by pivoting about their respective studs 68. Rotary motor 78 is powered by electrical wires, not shown, extending downward from the top of shaft 50, and is controlled by a computer system to be described. Motor 78 could also be a fluid motor, driven hydraulically or pneumatically.

In FIGS. 4 and 5 the means of supporting pallet 20 is shown. Pallet 20 has four wheels 86 with two mounted on a corner of a pallet edge perpendicular to the adjacent storage space. Wheels 86 utilize conventional low speed bearings and are attached to the under side of pallet 20 by conventional U-shaped brackets mounting axles for each wheel. Two channels for the opposed pairs of wheels 86 are defined by two pairs of guides 88 which are attached to the upper side of lift L1. Guides 88 guide pallet 20 along a path which is perpendicular to the edge of the storage space immediately adjacent the lift. Wheels 86 can be replaced by projections to form parallel skid surfaces 85, as shown in FIG. 6A, and the operation would be identical.

The outward edge of pallet 20 provides a purchase to permit a transfer mechanism 92 to transfer the pallet from the lift L1. In FIG. 3 transfer mechanism 92 consisting of an electric motor 94, a worm gear assembly 96, a shaft 98, sprockets 100, chains 102, and pusher projections 104 are shown. In FIG. 4 sprockets 100 are shown at each end of chains 102. Wires extending downward from the top of the shaft, power electric motor 94 which is also under computer control. When motor 94 is operated, pusher projections 104 bear against the edge of pallet 20 opposite the storage space and force the pallet leftward, as shown in FIG. 6. An automobile 106 shown in phantom outline is mounted upon pallet 20 to be transferred to the storage area. The adjacent pallet 20 containing no automobile is forced leftward at the same time by the loaded pallet being forced against it. Wheels 86, shown in FIG. 4, are located in line with one of two I-beams 87 which are aligned with opposite sets of wheels to provide a supporting surface between lifts L1 and L2, and as first pallet 20 is moved leftward all the other pallets are moved the same amount along these I-beams. Wheels 86 can be replaced by skids 85 as shown in FIG. 6A. Transfer mechanism 92 is duplicated by in mirror image on lift L2.

In FIGS. 12 through 31 a schematic representation is used to illustrate the sequence of operations used to store or retrieve an automobile. Individual storage locations are designated by a column and a level location; with the four columns being designated A, B, C, or D and the levels being ground, not indicated on the diagram, and numbered levels 1, 2, and 3. A horizontal line within a shaft location is used to indicate the location of lifts L1 and L2. A pallet is indicated by a horizontally oriented rectangle. Numbers are used as an identifier for each individual pallet. A number enclosed by a box is used to indicate that an automobile is located upon that particular pallet. An arrow is used to indicate both an operation and the direction of the operation. An arrow directed at a lift indicates that the lift has been moved in that direction. An arrow directed toward the storage area from a lift indicates that a pallet was transferred from the lift to the adjacent storage area by the transfer mechanism on the lift.

Whenever a pallet is transferred from a lift a pallet is forced onto the opposite lift by the intermediate pallets between the two lifts acting as a ram. In all cases where a pallet is moved on or off a lift it is assumed, for an accurate description, that the bridging mechanisms have previously closed the gaps between the storage areas and the lifts prior to the operation. Likewise, when a lift is moved to a different level after a pallet was transferred to or from the lift it is assumed that the bridging mechanism has reestablished the gap to make that operation possible.

In FIG. 12 pallets are located in all storage areas, loading stations S2 and lift L1, with lifts L1 and L2 at ground level. Only pallet 4 contains an automobile. In FIGS. 12 through 23 a typical sequence of operations used to retrieve the automobile stored on pallet 4 is shown. In this illustration the pallet identifier and automobile identifier are treated as one. In the actual system each pallet will have an identifier but each identifier will be further associated with the automobile identifier for all stored vehicles.

Prior to the operation shown in FIG. 12 the quiescent state of the system existed which is the normal state between storage or retrieval cycles with a pallet located at both loading stations S1 and S2, lifts L1 and L2 at the ground level containing no pallets, and with all of the storage locations containing a pallet. FIG. 12 illustrates the first step of retrieving an automobile from pallet 4 at locations column C level 3, which for simplicity will be called C-3. The presence of an automobile is indicated by the box about the number 4. A pallet 13 was transferred from loading station S1 to lift L1. In FIG. 13, the second step, shows both lifts L1 and L2 moved from the ground level to level 2. In FIG. 14, the third step, shows pallet 13 transferred from lift L1 to storage location D-2 which shifts all of the other pallets on this level leftward and moves pallet 8 onto lift L2.

In FIG. 15, the fourth step, shows both lifts L1 and L2 moved from level 2 to level 3. In FIG. 16, the fifth step, shows pallet 8 transferred from lift L2 to storage location A-3, which shifts all of the other pallets on this level rightward and moves pallet 2 onto lift L1.

In FIG. 17, the sixth step, shows both lifts L1 and L2 moved from level 3 to level 2. In FIG. 18, the seventh step, shows pallet 2 transferred from lift L1 to storage location D-2 which shifts all of the other pallets on this level leftward and moves pallet 10 onto lift L2.

In FIG. 19, the eighth step, shows both lifts L1 and L2 moved from level 2 to level 3. In FIG. 20, the ninth step, shows pallet 10 transferred from lift L2 to storage location A-3 which shifts all of the other pallets on this level rightward and moves pallet 4 onto lift L1.

In FIG. 21, the tenth step, shows both lifts L1 and L2 moved from level 3 to ground level. In FIG. 22, the eleventh step, shows pallet 4 moved from left L1 to loading station S1 by the loading mechanism. This completes the retrieval or call process and the automobile on pallet 4 can now be driven away which will again restore the system to the quiescent condition as shown in FIG. 23.

Figure 24:
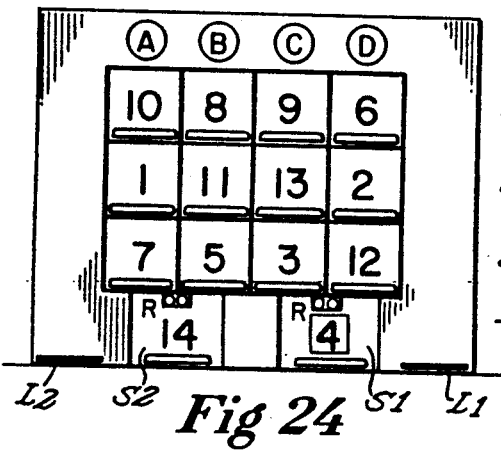
Figure 25:
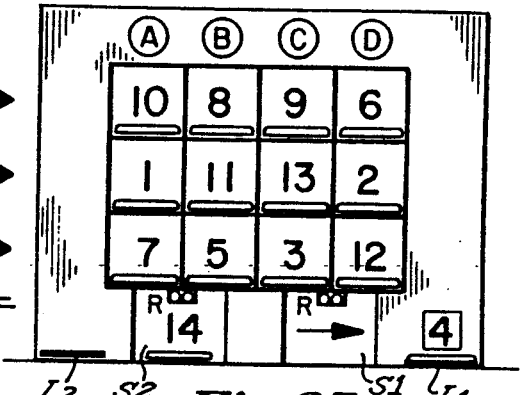
Figure 26:
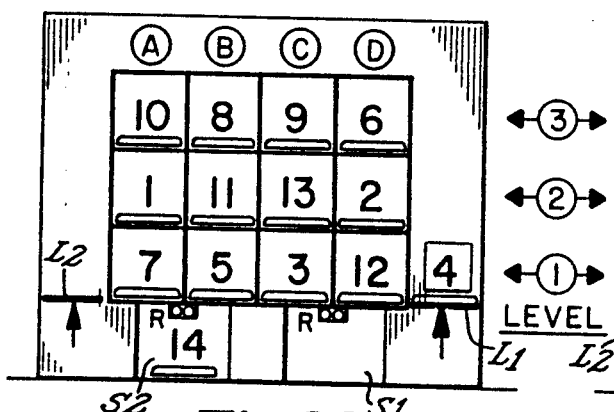

In FIG. 24 an automobile is shown driven onto pallet 4 at loading station S1 for storage. In FIG. 25, the first step, pallet 4 is transferred onto lift L1 by the loading mechanism. In FIG. 26, the second step, shows both lifts L1 and L2 moved from ground level to level 1.

Figure 27:
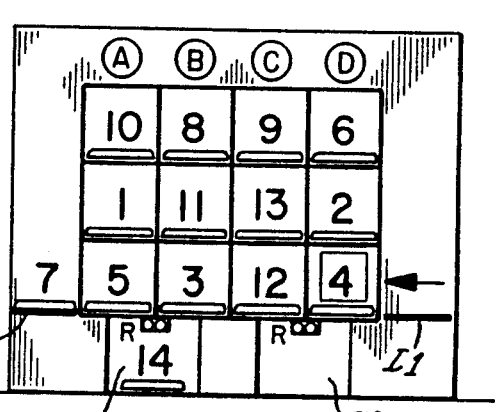
Figure 28:
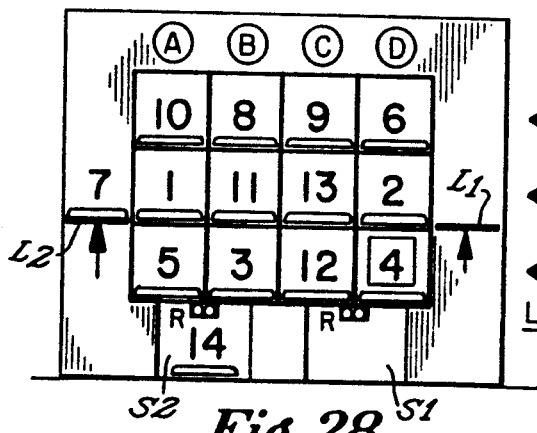

In FIG. 27, the third step, shows pallet 4 transferred to storage location D-1 to complete the storage process of the automobile located on pallet 4. This transfer also shifts all of the other pallets on this level leftward and moves pallet 7 onto lift L2. In FIG. 28, the fourth step, shows both lifts moved from level 1 to level 2.

Figure 29:
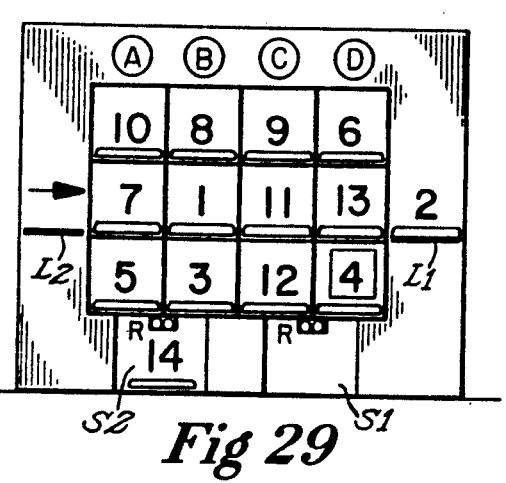

In FIG. 29, the fifth step, shows pallet 7 transferred from lift L2 to storage location A-2 which shifts all of the other pallets rightward and shifts pallet 2 onto lift L1. In FIG. 30, the sixth step, shows both lifts L1 and L2 moved from level 2 to ground level.

FIG. 31, the seventh step, shows pallet 2 loaded from lift L1 to loading station S1. This completes the storage process with pallet 4 and automobile in storage location D-1 and with pallet 2 in loading station S1 which returns the system to the quiescent state in a condition where an automobile can be called or stored.

These sequences of operations are representative of the actual storage and retrieval process. While automobiles were only retrieved and stored to and from loading station S1 the sequence of operations is essentially identical from loading station S2, being the mirror image of operations. If other automobiles are already present in various locations in the storage facility a different strategy is required A program with the requisite complexity able to deal with the various situations which may arise is a part of this system. The program must not only deal with the remaining inventory and location of all pallets and associated automobiles and a storage/retrieval strategy but must also deal with the status of the physical movements of the lifts, the pallets, the bridging mechanism, and the transfer and loading mechanisms. This will be described further later.

Figure 11:
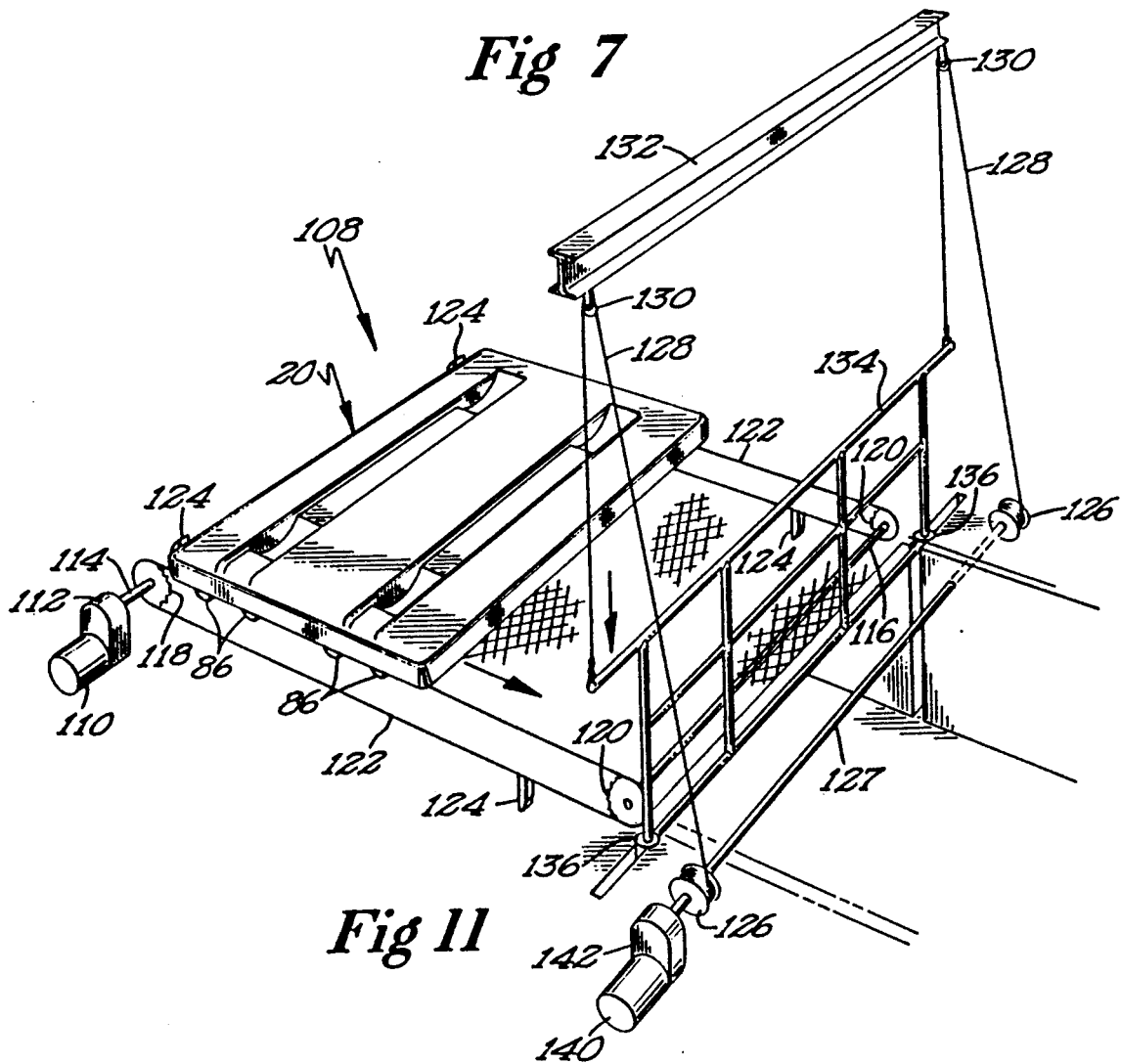
FIG. 11 is a perspective view of a loading station.

In FIGS. 10 and 11 a loading station 108 is shown for lift L1. A loading station for lift L2 is essentially identical to loading station 108 but is oriented in the opposite direction to load automobiles on the opposite side of the structure. The operation of loading station 108 is similar to the operation of transfer mechanism 92. An electric motor 110 drives reduction gears 112 which in turn drive a shaft 114 mounted in bearings on one end of loading station 108. A shaft 116 mounted on the opposite end of loading station 108 is also mounted within bearings. Shaft 114 has a pair of sprockets 118 mounted in each end and shaft 116 has a pair of sprockets 120 mounted on each end. The pair of sprockets 120 drive a pair of chains 122 connected between the two aligned opposing pairs of sprockets. A pair of projections 124 are attached to each respective chain 122 and provide a means to move pallet 20 across a pair of I-beams 123, one of which is shown in FIG. 10. The propulsion is similar to that of the transfer mechanism except that the distance moved is greater from the loading station location to the adjacent lift L1. Before a pallet is transferred to the lift by the loading mechanism, or from the lift by the transfer mechanism, the bridging mechanism is used to close the gap between the lift and the end I-beams 123.

A pair of pulleys 126 attached to the end of shaft 127 outside of sprockets 120 each have a cable 128 attached which lead around a second pulley 130 which are suspended with conventional brackets from I-beam 132 which extends across the lift opening. Cables 128 are attached to a gate 134 by clamps. Gate 134 rides in a pair of guides 136. A motor 140 acting through reduction gears 142 drives shaft 127. The combination of cables and pulleys are controlled by the computer system such that before pallet 20 is moved rightward gate 134 is lowered below the level of the pallet to permit the pallet to be loaded. At all times except when a pallet is being loaded onto or transferred from the lift the gate is positioned in the upper position to act as a guard.

Projections 124 are moved rightward until pallet 20 is moved onto the adjacent lift. The gap between the lift and the loading station is closed by the bridging mechanism to permit this transfer.

When a pallet is to be transferred from the lift to loading station 108 projections 124 are positioned on the underside of the mechanism. After a pallet is moved off the lift then motor 110 is energized with the rotation direction reversed to push an empty pallet 20 leftward by projections 124 to the location shown in FIG. 11 ready to load or unload an automobile.

Motor 110 is also controlled by the computer to coordinate the operation of the gate, the loading mechanism, the transfer mechanism and the bridging mechanism for the adjacent lift. Both loading stations L1 and L2 are coordinated in this manner.

In FIG. 32 a block diagram of the computer system and associated components is shown. A card reader C10 and keypad provides input means for computer C16. Card reader C10 is a conventional card reader of the type used to read the magnetic stripe on a credit card. This permits using the credit card number as an automobile identifier and can be used to communicate to other systems to verify credit worthiness, stolen card information or other data.

Number keypad C12 permits using a keyed in identifier if desired. This can be used as an economy measure to eliminate card reader CIO or solely as at an apartment complex. Sensors C14 are located at each extreme range of motion of each operating mechanism and the floor level location of both lifts. Image sensors C17 are located on both loading areas. This device utilizes existing technology to scan an area to determine background information. As items are introduced into the field of view the image sensor can determine the difference. This permits the determination of the presence of automobiles and people in the loading area to provide safe operation of the equipment.

Readouts C18, displays and indicators C22 provide status and control information from the computer C16. Output commands are sent from computer C16 to motor and solenoid controller C20 which provides the proper level signals to control motors C-23, solenoids and other actuators C24.

The loop is closed when the operations caused by the outputs results in motions which feed back through sensors C14 to computer C16 as input signals. This permits control of all parameters and observation of the results of the control signals. Out of limit sensors are also provided to indicate unsafe conditions which are used to shut down the system and summon supervisory assistance.

The computer C16 is a conventional micro-processor with appropriate memory devices, which has a stored program developed expressly to perform the functions described. All prescribed operations along with optimized storage and retrieval strategies are incorporated here.

The following numbered listing of operations is representative of the sequence of operations activated when an automobile is to be driven into an empty loading station and the automobile identifier entered into the system.

1. Is there a pallet on the loading system?
2. If 1 is no, the program to retrieve a pallet from the appropriate storage location previously described is not initiated and an automobile is prohibited from entering the loading station by appropriate display.
3. If the answer to 1 is yes; is there an automobile on the pallet?
4. If the answer to 3 is yes an automobile is prohibited from entering the loading station by appropriate display.
5. If the answer to 3 is no, an automobile is allowed to enter the loading station. This condition is indicated by appropriate signal and the system is conditioned to accept an automobile code.

6. Is there an automobile on the pallet?
7. If the answer to 6 is no condition 5 continues.
8. If the answer to 6 is yes an indicator to enter credit card is lit.
9. Is credit code entered?
10. If answer to 9 is no, 9 continues.
11. If answer to 9 is yes, loading station is scanned by image sensor for people to answer questions, are people present?
12. If answer to 11 is yes, load station is deactivated.
13. If answer to 11 is no, adjacent lift is summoned to ground level by actuation of lift motor, and lift sensors are used to determine whether adjacent lift is on ground floor. The lift will not change levels if the bridging mechanism has gap closed. Whenever a lift is summoned the response is delayed until a gap is established between the lift and structure.
14. If answer to 13 is yes, bridging mechanism is used to close gap between loading station and lift, guard fence is lowered and pallet with automobile is loaded upon lift. The gate is then raised and the gap is reestablished.
15. Routine to store automobile previously described is imitated.

This sequence of operations is representative of the coordination. Since the system is computer controlled the program can be modified at any time to incorporate a different strategy. The essence of a program is the fact that it can be changed. This permits adapting the system to a number of conditions and environments. As examples some of the storage levels could be below ground level which can easily be handled by a different program. The number of levels or the number of storage locations per level may also change and the program modified to accommodate the changes. Certain physical constraints will always apply, such as closing the gap between the lift and storage or loading area before transferring a pallet, and the necessity of always having the lifts opposite one another when making a transfer on all except the loading level.

The motors for the lifts, transfer mechanisms and loading mechanisms can readily be sized such that a lift can move from level to level in approximately seven seconds or a pallet move from one pallet location to the adjacent one in approximately the same length of time. Using these figures as typical values in the previous example shown in FIGS. 12 and 23 eleven steps were required to retrieve an automobile which is 77 seconds and in FIGS. 24 through 31 seven steps were required to store a car which is 49 seconds. While these figures will change depending upon the locations available for storage and the location of the automobile to be retrieved, they are still indicative of the general speed of this system. This compares very favorably with the usual length of time required at a conventional parking ramp.

The illustration of the storage structure shown in FIG. 2 has a steel structure enclosed by a brick skin and roof. In warm climates, or for underground storage levels this outer skin is unnecessary. One advantage of this storage system is the inaccessibility of the storage levels to the public which protects the automobile from vandalism and theft. A further advantage, since the public never leaves the main level, is the minimized exposure to crime of the user. If desired, manned or televised surveillance of the loading area can readily be included as a part of the system.

The heart of this system is the opposed pair of lifts and intermediate storage structure with all the machinery necessary to lift or lower, to store or retrieve the automobiles being on or associated with the lifts. This results in a very cost efficient system. The use of a similar system on the main level to move the automobiles at the loading station results in a duplication of the majority of the system. While the system illustrated indicates loading only from the ground level, loading can be provided at any desired level. This would probably be more applicable for storing items other than automobiles.

This invention solves a very real problem in today's society in both providing very compact vehicle storage with the minimum of complexity, and in minimizing the vehicle and user's exposure to crime.

While this invention has been described with reference to an illustrative embodiment, this description is not intended to be construed in a limiting sense. The loading station, for example, can be located on any level if roadway is elevated, or if items other than vehicles are stored from a level of another structure other than ground level. Various other modifications of the illustrative embodiment, as well as other embodiments of the invention, will be apparent to persons skilled in the art upon reference to this description. It is therefore contemplated that the appended claims will cover any such modifications or embodiments as fall within the true scope of the invention.

What is claimed is:
1. A structure incorporating automatic storage and retrieval apparatus comprising:
   (a) a number of identical pallet means, each pallet means having translation means thereunder, arranged such that the pallet means can be translated along a path which is planar to the upper surface of the pallet means;
   (b) a structure comprising a number of identical sized, horizontal levels which are aligned in a vertical array extending between a pair of vertical lift shafts which reach from ground level to all the other levels at opposite ends of the levels; each level having four sides oriented with a first pair of sides perpendicular to the shafts, and a second pair of sides parallel and open to the shafts; the levels being dimensioned such that, when filled with pallet means with their direction of motion oriented perpendicular to the shafts, each level will exactly hold an integral number of pallet means in the dimension between the shafts; and with the upper surface of each level having unobstructed, stationary upper surface means dimensioned, located and adapted to cooperate with and receive the pallet translation means of each pallet in pallet moving contact therewith, such that the pallet means can be transferred from either lift onto the surface means and thence, in free movement across the level in a direction perpendicular to the shafts;
   (c) a lift mounted within each shaft, each lift having lift mechanism means arranged such that the respective lift can be moved from ground level to any other level; with the lifts sized to accommodate a pallet means oriented with the direction of motion perpendicular to the levels;
   (d) transfer means on each lift operatively associated therewith and dimensioned, located and arranged such that pallet means located on a respective lift can be translated from either lift to the adjacent surface means with the pallet translation means cooperating with the surface means in moving contact therewith when the lift is positioned at any one of the levels; and (e) control means arranged to operatively control the lift mechanism means and the transfer means so as to position both lifts at the same level whenever a pallet means is to be transferred from a lift to that level, whereby the pallet means being transferred from the one lift onto the stationary upper surface causes the pallet means adjacent the other lift to be transferred thereto by a pushing motion of any intermediate pallet means and the pallet means thereagainst.

2. Apparatus as in claim 1 wherein:
(a) there is a gap between each lift and the adjacent, multiple level structure; and
(b) bridging means for each lift, operative to close the gap between a respective lift and an adjacent level.

3. Apparatus as in claim 2 and further comprising:
(a) control means arranged to operatively control the lift mechanism means, the transfer means and the bridging means for each lift so as to position both lifts at the same level and to close the gaps at that level by operation of said bridging means whenever a pallet means is transferred from a lift to a level, and so as to operate the bridging means to open the gap for each lift before the lifts are moved to another level.

4. Apparatus as in claim 2 wherein the bridging means each comprises:
(a) a vertical guide rail as a portion of the structure with the vertical rail having a web oriented perpendicular to the levels and located adjacent each lift on the side opposite the levels;
(b) a rack and pinion assembly connected to the lift and having rotary driving means connected to a pinion movable on a horizontal rack and a pair of rack rollers rotatably mounted adjacent each other and embracing said web, whereby selective rotary driving movement of said rotary driving means moves said pinion back and forth on said rack so as to move the lift towards and away from each adjacent level and thus to selectively close and open the gap.

5. Apparatus as in claim 1 and further comprising:
(a) a pallet means loading station located on one of the levels; and
(b) a loading station mechanism means, arranged such that a pallet means located on the loading station level upper surface means can be translated thereon from a location on the loading station onto a lift adjacent the level, and from a location on the level adjacent the lift to the loading station.

6. Apparatus as in claim 5 and further comprising:
(a) control means arranged to operatively control said loading station mechanism means and said lift mechanism means so that a pallet means may be transferred from the loading station level upper surface means to a lift only when the lift is located at the loading station level.

7. Apparatus as in claim 5 and further comprising:
(a) gate means positioned adjacent at least one of said lift shafts at said loading station level and operative between a closed position to protect individuals from the lift shaft and an open position to permit transferring a pallet to and from a lift.

8. Apparatus as in claim 7 wherein the gate means comprises:
(a) a gate arranged such as to cover the opening to the lift adjacent the loading mechanism in said closed position;
(b) vertical guide means arranged to steer the gate in a vertical plane adjacent the edge of the loading level, such that the gate can be elevated to cover the lift opening or lowered below the edge of the loading level to clear the lift opening; and
(c) elevating means for raising and lowering the gate between said closed and open positions.

9. Apparatus as in claim 5 wherein the pallet loading station is located on the ground level and has vehicle loading means arranged such that a vehicle can be driven on and off a pallet means located on the loading station.

10. Apparatus as in claim 5 wherein the pallet loading station mechanism means comprises:
(a) two loading shafts rotatably mounted below the parallel surfaces of the loading station level parallel to one another, with one loading shaft adjacent and parallel to the lift opening and the other loading shaft adjacent the loading station side opposite the lift;
(b) loading sprockets mounted on opposite ends of both of the loading shafts, the sprockets on the same end of each shaft having a chain encircling and engaging both sprockets; with both chains having a single projection directed outwardly from the sprockets synchronized such as to move together about the shafts, with the sprockets, projections, and the loading shafts sized and located, such that, when a pallet is located upon the parallel upper surfaces of the level, only the projections will strike the edge of the pallet as the chains move the projections; and
(c) a loading motor arranged to drive one of the loading shafts.

11. Apparatus as in claim 10 and further comprising control means operative to generate control signals of the proper type and level to operate the loading motor.

12. Apparatus as in claim 1 wherein the structure further comprises a loading station on one of the levels, and said control means has input identifier means arranged such that a pallet load identifier for a pallet means located at a loading station can be entered into the control means, and having program means correlating the pallet load identifier and the pallet means, and further having means to track the location of the identifier pallet load wherever it may be stored within the structure levels.

13. Apparatus as in claim 12 wherein the control means comprises a computer with conventional computer input means; with sensor input means arranged to sense the positions of the pallet translation means, the pallet means, and the vertical positions of the lifts; the computer having output means for conventional displays and indicators for human interpretation, having conventional computer readouts adapted to determine the inner status of the computer for trouble shooting and reprogramming, having electrical means arranged to coordinate the operation of the controlled elements of the apparatus and to optimize the storage and retrieval operation.

14. Apparatus as in claim 12 wherein the input indentifier means comprises a credit card reader means whereby a magnetic code identifier can be read automatically into the computer means.

15. Apparatus as in claim 12 wherein the input identifier means comprises a number keypad means whereby a number code can be entered manually into the computer means.

16. Apparatus as in claim 1 wherein the pallet means comprises a four sided horizontal load surface.

17. Apparatus as in claim 16 wherein:
   (a) the pallet translation means comprises at least four wheels attached to the pallet and aligned such as to permit the pallet to be rolled on the wheels only in a direction parallel to a pair of the sides; and
   (b) said upper surface means of each level comprises a pair of parallel horizontal surfaces extending perpendicularly between the lift shafts spaced the same distance between centers as the distance between the pallet wheels, measured perpendicular to the direction of motion, and having a width adequate to support the pallet wheels.

18. Apparatus as in claim 16 wherein:
   (a) the pallet translation means comprises a plurality of skids attached to the pallet and aligned such as to permit the pallet to be skidded only in a direction parallel to a pair of the sides;
   (b) the level upper surface means comprises a pair of parallel horizontal surfaces extending between the lifts.

19. Apparatus as in claim 1 wherein:
   (a) the lift is four sided with one edge aligned with the adjacent side of the levels;
   (b) the lift mechanism means are each located on a platform above each lift shaft and comprise a horizontal lift drive shaft rotatably mounted above the platform, a lift motor driving the lift shaft, two drums with one drum being mounted on each end of the lift drive shaft with each drum having a cable wound about and attached thereto, and a pulley mounted above each corner of the platform and having a hole below each pulley, and being arranged such that one of the cables from each drum is led around a pulley thence down through the adjacent hole and attached to a corner of the lift.

20. Apparatus as in claim 1 wherein the transfer means for each lift comprises two chains, four sprockets, and two parallel shafts which are rotatably mounted horizontally across opposite ends of the lift, which are parallel to the adjacent storage area, with the sprockets being mounted on opposite ends of the two shafts and holding the two chains in parallel such that the chains encircle the lift, and with an electric motor driving one of the shafts, and a single projection attached to each chain and projecting angularly outwardly therefrom, with the chains being synchronized such that the projections move together about the lift; and with the location of the shafts and sprockets and the dimensions of the projections being such that only the projections can strike the edge of a pallet located upon the lift as the chains move the projections; and further comprising a pair of tracks on the upper surface of the lift dimensioned, located, and spaced such as to contain and guide the translation means of a pallet for movement onto and off of said upper surface means of each level.

* * * * *